United States Patent
Perez (10) Patent No.: US 9,455,837 B2
(45) Date of Patent: Sep. 27, 2016

(54) METHOD AND SYSTEM FOR EXCHANGE MULTIFUNCTION JOB SECURITY USING IPV6 NEIGHBOR DISCOVERY OPTIONS

(75) Inventor: Maria Perez, Half Moon Bay, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 304 days.

(21) Appl. No.: 12/979,650

(22) Filed: Dec. 28, 2010

(65) Prior Publication Data

US 2012/0166805 A1  Jun. 28, 2012

(51) Int. Cl.

| | |
|---|---|
| H04L 9/32 | (2006.01) |
| G06F 21/00 | (2013.01) |
| G06F 21/60 | (2013.01) |
| H04L 29/06 | (2006.01) |
| G06F 21/33 | (2013.01) |
| H04L 29/12 | (2006.01) |

(52) U.S. Cl.
CPC ........... *H04L 9/3263* (2013.01); *G06F 21/608* (2013.01); *H04L 61/2092* (2013.01); *H04L 63/0236* (2013.01); *H04L 63/0823* (2013.01); *H04L 29/12113* (2013.01); *H04L 61/6059* (2013.01)

(58) Field of Classification Search
CPC ............. G06F 21/608; H04L 61/6059; H04L 63/164; H04L 29/12113; H04L 63/0428; H04L 61/2092; H04L 63/0236; H04L 63/0823; H04L 9/3263
USPC .......................................................... 713/175
See application file for complete search history.

(56) References Cited

U.S. PATENT DOCUMENTS

| | | | | |
|---|---|---|---|---|
| 6,938,154 B1 * | 8/2005 | Berson | ..................... G06F 21/33 713/155 |
| 2003/0014640 A1 * | 1/2003 | Loyd | ..................... G06F 21/608 713/182 |
| 2003/0182475 A1 * | 9/2003 | Gimenez | ................. G06F 21/10 710/8 |
| 2005/0268090 A1 * | 12/2005 | Saw et al. | ..................... 713/156 |
| 2005/0273852 A1 * | 12/2005 | Ferlitsch | ................. H04L 9/321 726/17 |
| 2006/0064580 A1 * | 3/2006 | Euchner | ................ G06F 21/608 713/156 |
| 2006/0075221 A1 * | 4/2006 | Moore et al. | ................. 713/156 |
| 2006/0136726 A1 * | 6/2006 | Ragnet et al. | ................. 713/171 |
| 2008/0239385 A1 * | 10/2008 | Suzuki | ............. H04L 29/12783 358/1.15 |
| 2010/0229030 A1 * | 9/2010 | Shouno | ............................. 714/5 |
| 2011/0013219 A1 * | 1/2011 | Nuggehalli | ........... G06F 3/1203 358/1.15 |

OTHER PUBLICATIONS

Arkko et al., "Secure Neighbor Discovery (SEND)", RFC 3971, Internet Engineering Task Force (Mar. 2005).*

* cited by examiner

*Primary Examiner* — Theodore C Parsons
(74) *Attorney, Agent, or Firm* — Buchanan Ingersoll & Rooney PC (57) ABSTRACT

A method, system and computer program product are disclosed that facilitates exchange multifunction job security using IPv6 Neighbor Discovery, which can include generating a print job on a first node, the first node having a first software module and a first IP filter configured to capture neighbor solicitation messages and sending a neighbor solicitation request with the at least one security option to a second nod. Capturing the neighbor solicitation request via a second IP filter on the second node; validating a digital certificate and decrypting a first encrypted job identifier associated with the neighbor solicitation request using a second software module on the second node. Sending a neighbor advertisement to the first node, the neighbor advertisement including a second encrypted job identifier for the print job and capturing the neighbor advertisement from the second node with the first IP filter, and processing the job on the first node.

18 Claims, 4 Drawing Sheets

METHOD AND SYSTEM FOR EXCHANGE MULTIFUNCTION JOB SECURITY USING IPV6 NEIGHBOR DISCOVERY OPTIONS

FIELD OF THE INVENTION

The present invention relates to a method and system for exchange multifunction job security using IPv6 Neighbor Discovery options, and more particularly to a software module or software application associated with a computer device or host device such as an image forming apparatus, which uses IPv6 Neighbor Discovery options for exchange multifunction job security.

BACKGROUND OF THE INVENTION

Networks have enhanced our ability to communicate and access information by allowing one personal computer to communicate over a network (or network connection) with another personal computer and/or other networking devices, using electronic messages. When transferring an electronic message between personal computers or networking devices, the electronic message will often pass through a protocol stack that performs operations on the data within the electronic message (e.g., packetizing, routing, flow control).

The first major version of addressing structure, Internet Protocol Version 4 (IPv4), is still the dominant protocol of the Internet, although the successor, Internet Protocol Version 6 (IPv6) is being deployed actively worldwide. The IPv6 network protocol provides that IPv6 hosts or host devices (e.g., image forming apparatuses and other devices) can configure themselves automatically (i.e., stateless address autoconfiguration) when connected to an IPv6 network using ICMPv6 neighbor discovery messages (i.e., Neighbor Discovery Protocol or NDP). When first connected to a network, an IPv6 host sends a link-local multicast neighbor solicitation request advertising its tentative link-local address for double address detection (dad), and if no problem is encountered, the host uses the link-local address. The router solicitations are sent (or router advertisements are received depending on timing) to obtain network-layer configuration parameters, and routers respond to such a request with a router advertisement packet that contains network-layer configuration parameters.

With the implementation of IPv6 networks, it would be desirable to add additional security to a computer device and/or host device having IPv6 capabilities by including a software module or software application associated with the computer device and/or host device, and which uses IPv6 Neighbor Discovery Options for exchange multifunction job security.

SUMMARY OF THE INVENTION

In consideration of the above issues, a software module or software application associated with a computer device or host device such as an image forming apparatus, which uses IPv6 Neighbor Discovery Options for exchange multifunction job security is disclosed herein.

In accordance with an exemplary embodiment, a method that facilitates exchange multifunction job security using IPv6 Neighbor Discovery, the method comprises: generating a job on a first node, the first node having a software module, which creates at least one security option for the job; sending a neighbor solicitation request with the at least one security option to a second node; receiving the neighbor solicitation request on the second node, the second node having a software module for processing the neighbor solicitation request with the at least one security option; sending a neighbor advertisement to the first node; receiving the neighbor advertisement from the second node to obtain a job identifier for the job; and if the job identifier for the job is obtained, processing the job on the first node.

In accordance with another exemplary embodiment, a system that facilitates exchange multifunction job security using IPv6 Neighbor Discovery for a first and a second node, the system comprises: generating a job on a first node, the first node having a software module, which creates at least one security option for the job; sending a neighbor solicitation request with the at least one security option to a second node; receiving the neighbor solicitation request on the second node, the second node having a software module for processing the neighbor solicitation request with the at least one security option; sending a neighbor advertisement to the first node; receiving the neighbor advertisement from the second node to obtain a job identifier for the job; and if the job identifier for the job is obtained, processing the job on the first node.

In accordance with a further exemplary embodiment, a computer program product comprising a non-transitory computer usable medium having a computer readable code embodied therein for a first node and a second, the computer readable code configured to cause the first and second nodes to executed a process for a software module that facilitates exchange multifunction job security using IPv6 Neighbor Discovery, the process comprises: generating a job on a first node, the first node having a software module, which creates at least one security option for the job; sending a neighbor solicitation request with the at least one security option to a second node; receiving the neighbor solicitation request on the second node, the second node having a software module for processing the neighbor solicitation request with the at least one security option; sending a neighbor advertisement to the first node; receiving the neighbor advertisement from the second node to obtain a job identifier for the job; and if the job identifier for the job is obtained, processing the job on the first node.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
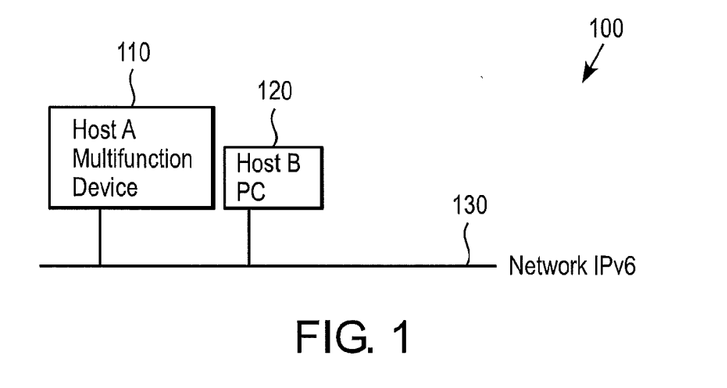
FIG. 1 is an illustration of a network system with a network communication protocol in accordance with an exemplary embodiment.

FIG. 1 shows a network system 100 having a normal communication protocol, which includes a host device (node A) 110 in the form of an image forming apparatus or multi-functional device in accordance with an exemplary embodiment. As shown in FIG. 1, the network system 100 is composed of a host device (or node A) 110 and one or more second hosts or client devices (node B) 120. The host device (node A) 110 and the one or more second hosts (node B) 120 are connected to each other through an IPv6 communication network 130 in a state capable of performing data communications. It can be appreciated that in accordance with an exemplary embodiment, the hosts (or nodes) 110, 120 can be any network device, which supports an IPv6 communication protocol (Internet Protocol version 6). Examples of communication networks 130 consistent with embodiments of the invention include, but are not limited to, the Internet, an Intranet, a local area network (LAN) and a wide area network (WAN). The host device (or node A) 110 and the one or more second hosts (node B) 120 can be connected with a wire or can be connected with a wireless connection by using radio frequency (RF), infrared (IR) transmission, USB, IEEE1394 and/or other suitable wireless technology.

It can be appreciated that in accordance with an exemplary embodiment, the host device (node A) 110 may be embodied by a printer, a Multi-Function Peripheral (MFP) and other known image forming apparatuses, which prints an image on a printing medium (or a recording medium) such as a sheet of paper based on printing data generated by the one or more second hosts (or node B) 120. In accordance with an exemplary embodiment, the host device (node A) 110 is a Multi-Function Peripheral (MFP), which includes at least a copy function, an image reading function, and a printer function, and forms an image on a sheet based on a print job (print instruction) sent from the one or more second hosts (or node B) 120, image data read by an image reading section, such as a scanner, provided in the host device (or node A) 110, or the like.

In accordance with an embodiment, the one or more second hosts (or node B) 120, which may be embodied by a computer system, and generates the printing data usable in the host device (or node A) 110 and transmits the generated printing data to the host device (or node A) 110. An example of the one or more second hosts (or node B) 120 may include a computer and/or a portable device such as a notebook personal computer, a cellular phone and a personal digital assistant (PDA). The host device (or node A) 110 and the one or more second hosts (or node B) 120 can constitute an image forming system to install a communication port, to generate printing data, and to perform a printing operation of forming an image on a printing medium according to the printing data.

It can be appreciated that the one or more second hosts (or node B) 120 can be a plurality of personal computers, and has the function of sending a print job to the first host device 110 in the form of an image forming apparatus. A printer driver program (hereinafter, sometimes simply referred to as a printer driver) is installed in the second host 120, and the one or more second hosts 120 uses the function of the printer driver to generate a print job including the data of print conditions to be applied at the time of image formation, image data, and the like, and to send the generated print job to the first host device 110 in the form of an image forming apparatus.

In the IPv6 protocol, the generation of an IP address (or IPv6 address) for an image forming device or other apparatus/device is defined in RFC 2462, entitled "IPv6 Stateless Address Autoconfiguration." The IPv6 stateless autoconfiguration utilizes several features in IPv6, including link-local addresses, multicasting, the Neighbor Discovery (ND) protocol, and the ability to generate the interface identifier of an address from an underlying data link layer address (or MAC ID). It can be appreciated that the IPv6 protocol provides a computer device or image forming apparatus the ability to generate a temporary address until it can determine the characteristics of the network it is on, and then create a permanent address it can use based on that information. In accordance with an exemplary embodiment, the steps a host device or image forming apparatus takes when using stateless autoconfiguration is generally configured to generate a link-local address, which is one of the two types of local-use IPv6 addresses. The link-local addresses has "1111 1110 10" for the first ten bits. The generated address uses those ten bits followed by 54 zeroes and then the 64-bit interface identifier, which will typically be derived from the data link layer (MAC) address.

A Link-Local Address Uniqueness Test (or Double address detection (DAD)) can be used to tests and to ensure that the address it generated is not for some reason already in use on the local network. The device or apparatus sends a Neighbor Solicitation message using the Neighbor Discovery (ND) protocol, and listens for a Neighbor Advertisement in response that indicates that another device is already using its link-local address; if so, either a new address must be generated, or autoconfiguration fails and another method must be employed.

Assuming the uniqueness test passes, the device assigns the link-local address (i.e., Link-Local Address Assignment) to its IP interface. This address can be used for communication on the local network, however, it cannot be used on the wider Internet (or communication network), since link-local addresses are not routed.

The node next attempts to contact a local router for more information on continuing the configuration. This is done either by listening for Router Advertisement messages sent periodically by routers, or by sending a specific Router Solicitation to ask a router for information on what to do next. The router also provides direction to the node on how to proceed with the autoconfiguration. The router can tell the node that on this network "stateful" autoconfiguration is in use, and tell it the address of a DHCP server to use. Alternately, the router will tell the host how to determine its global Internet address.

Assuming that stateless autoconfiguration is in use on the network, the host will configure itself with its globally-unique Internet address. It can be appreciated that this globally-unique address is generally formed from a network prefix provided to the host by the router, combined with the device's identifier as generated in the first step. In addition, when using the protocol stateless addressing (stateless auto-configuration) for IPv6, which is required by the IPv6 Ready Logo Program, the link-local addresses and global addresses are determined by concatenating an identifier unique to the adapter. Thus, when a MAC address broadcast is sent out, each network interface card on the local area network will see the broadcast address and automatically pass the information up to the upper layers of the OSI model (Open Systems Interconnection model).

Figure 2:
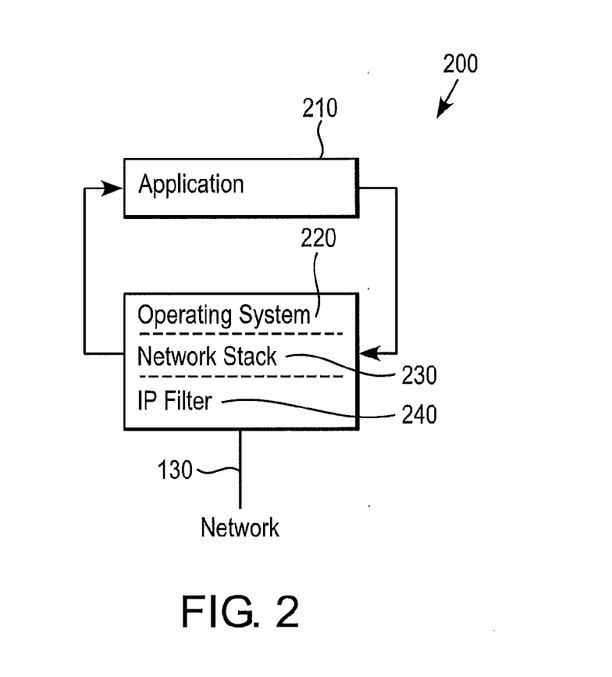
FIG. 2 is an illustration of a network stack having an application for filtering data packets in accordance with another exemplary embodiment.

FIG. 2 is an illustration of a network stack for a host device (or node) 200 having an application 210 for filtering data packets in accordance with an exemplary embodiment. As shown in FIG. 2, the host device 200 has a software module (or application) 210 and an IP filter (or packet capture filter) 240, which captures (or intercepts) outgoing and incoming data packets having neighbor solicitation and/or neighbor advertisement requests pursuant to the IPv6 protocol. As shown in FIG. 2, the software module 210 is preferably an application level module, which is configured to modify, drop, change, and judge Neighbor Discovery generated packages (i.e., neighbor solicitation or neighbor advertisement packets) as described herein. It can be appreciated that in accordance with an exemplary embodiment, the software module 210 can be part of the printer driver and/or firmware of a host device, such as a personal computer and/or multifunctional printer, a separate software module or application, or part to the operating system of the host device.

In accordance with an exemplary embodiment, the IP filter 240 forwards the incoming or outgoing packet having a neighbor solicitation or neighbor advertisement packet (or package) to the software module 210, which in combination with the socket layer modifies, changes, drops and/or judges the neighbor discovery generated packages as described herein. Each of the host devices (or nodes) preferably includes a software module (or application) 210, which can perform at least a portion and/or more preferably all of the steps necessary to set and/or decrypt the security options as described herein.

The packets (or packages) are preferably broadcast and/or sent out via a communication network (i.e., IPv6 network) 130. In accordance with an exemplary embodiment, the IP filter 240 preferably captures the IPv6 packet before the initial broadcast (i.e., neighbor discovery) and/or alternatively, before the packet is sent to the Network Stack 230 for processing. It can be appreciated that in accordance with an exemplary embodiment, the software module's 210 functionality also can be enabled or disabled at will by a network administrator or other designated individual.

The host device (or node) 200 includes an operating system 220 (OS), which acts as an interface between the device's hardware and application programs, and which is also responsible for the management and coordination of activities and the sharing of the resources within host devices. In accordance with an exemplary embodiment, the software module 210 runs on the operating system 220 of the computer device (or node), and the network layer is under or a part of the operating system 220. It can be appreciated that by utilizing a software module 210 as described herein, the operating system of the host device 200 does not need to be altered or changed in anyway.

Alternatively, it can be appreciated that in accordance with another exemplary embodiment, the operating system (OS) 220 can be configured to perform the methods as described herein. It can be appreciated that the examples as set forth herein are exemplary only, and as such, additional security options, which use IPv6 Neighbor Discovery messages can be implemented without departing from the present invention.

In accordance with an exemplary embodiment, a job is generated on the first node (or node A) having a software module 210, which creates at least one security option for the job, which is broadcast with the neighbor solicitation request (i.e., Neighbor Discovery request). The neighbor solicitation request is sent with the at least one security option from the first node pursuant to IPv6 protocol to a second node (node B). The neighbor solicitation request is received on the second node and is processed by a software module 210 associated with the second node. The software module 210 on the second node in return sends a neighbor advertisement to the first node, which is received by the first node. In accordance with an exemplary embodiment, if a job identifier for the job is obtained, the job is processed by the first node.

In accordance with another exemplary embodiment, when a job is created, either at node A or B (for this example node A will be the initiator and B the receiver) the software module (or application) chooses a private key. The software module (or application) 210 on node A creates at least one neighbor discovery security option, which is broadcast with the Neighbor Discovery request. In accordance with an exemplary embodiment, the neighbor discovery options includes one option containing a public certificate and a second option containing an encrypted job identifier number with an auto generated random number. The software module (or application) 210 on node A starts a neighbor discovery process between node A and node B by sending a neighbor solicitation with the neighbor discover options.

When the neighbor solicitation option is received at node B, a software module (or application) 210 associated with node B obtains the package via an IP filter 240 associated with node B, which is configured (i.e., has criteria) to capture neighbor solicitation messages and direct them to the software module 210. Once the software module 210 obtains the package, the software module 210 chooses a private key to decrypt the second option based on the certificated obtained. The software module 210 associated with node B decrypts the second option to obtain the job id (i.e., job identifier) and uses (i.e., generated for the response) a random number for the response to node A. In accordance with an exemplary embodiment, any packets (or packages) the software module (or application) 210 associate with node B is unable to decrypt are dropped. Otherwise the packet will be modified, and the neighbor discovery option will be stripped (i.e., removed from the packet), and a new checksum will be created and the packet will be accepted.

The software module (or application) 210 associated with node B then creates a neighbor option with an encrypted job identifier (or job id) and a random identifier. The software module 210 associated with node B obtains the package from the IP filer 240 (or "netfilter") and adds the neighbor option to the packet. When the software module (or application) 210 associated with node A receives the response, the software module 210 decrypts the packet and compares the random number assigned to the packet with the auto generated random number, and if the random number is confirmed (i.e., matches), the job identifier is obtained, and the job is executed.

In accordance with another exemplary embodiment, a copy of a document can be requested and obtained using Neighbor Discovery by sending a neighbor solicitation with at least one security option. For example, the at least one security option can include at least two security options. Initially, the application (or driver) 210 on node A sends the neighbor solicitation (NS) with the at least two security options, one being the certificate for the job. The other option can be encrypted by the certificate private key, and preferably contains the job id (i.e., job identifier) and/or other security parameters. When node B (i.e., a printer) receives the neighbor solicitation, the at least two security options are processed. The neighbor solicitation packet options are stripped, and the packets are accepted or dropped depending on the contents thereof. If the job identifier is obtained, node B (the printer) provides the copy of the document requested for such job identifier (or "job id") to node A.

It can be appreciated that in accordance with any of the exemplary embodiments, the at least one security option can include any type of security option including, but not limited to key cryptology, digital certificates, encrypted identifiers, and/or timestamps.

Figure 3:
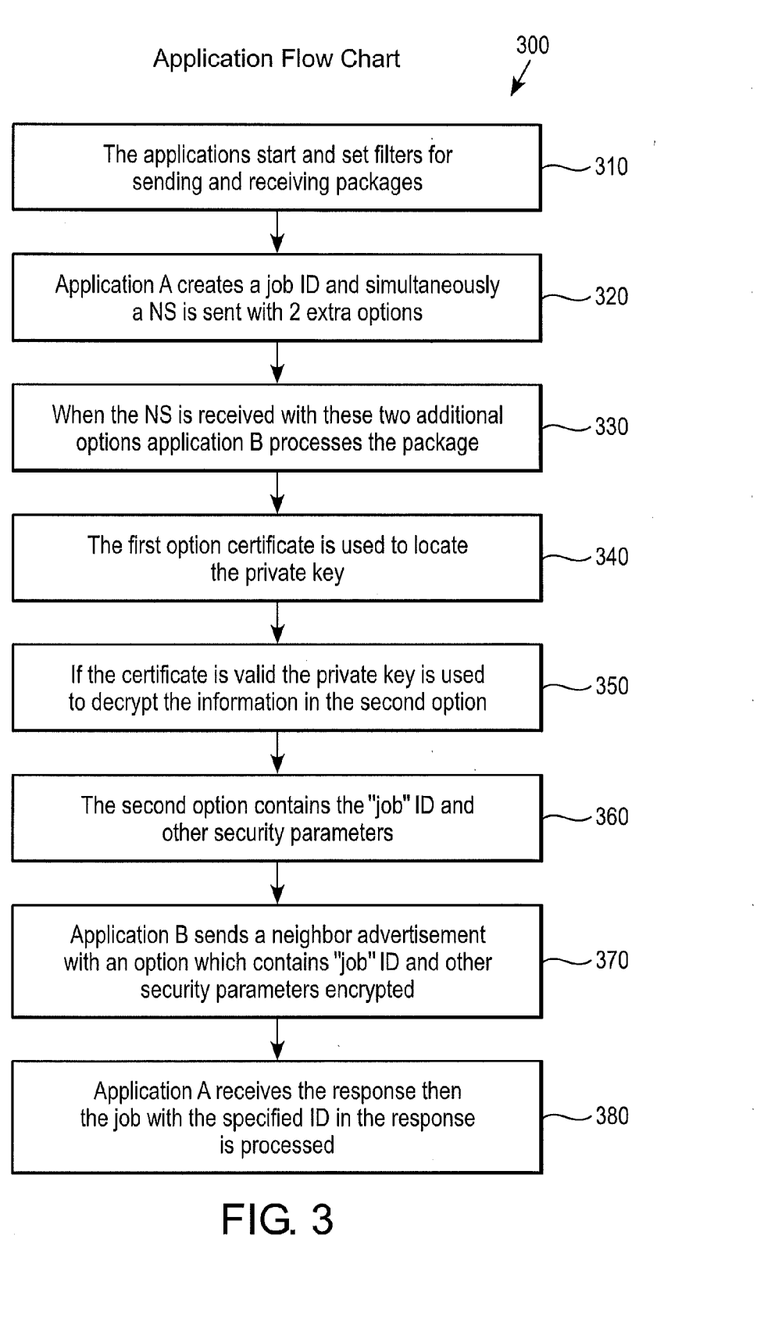
FIG. 3 is a flow chart showing another exemplary embodiment of an implementation of an application, which uses IPv6 Neighbor Discovery Options for exchange multifunction job security.

FIG. 3 is a flow chart showing another exemplary embodiment of an implementation of an application, which uses IPv6 Neighbor Discovery Options for exchange multifunction job security in accordance with an exemplary embodiment. As shown in FIG. 3, the system preferably includes at least two nodes, each having an application filter for sending and receiving packages (or packets) 310. In step 320, the application associated with one of the at least two nodes (i.e., first node) creates a job identifier (or job id) and simultaneously a Neighbor solicitation is sent with at least two security (or extra security) options (e.g., a private key certificate and an encrypted job identifier). In step 330, the Neighbor Solicitation is received by the other of the at least two nodes (i.e., second node), where the application associated with the other node processes the Neighbor Solicitation. In step 340, the first option certificate is used to locate the private key. In step 350, if the certificate is valid, the private key is used to decrypt the information in the second option (or encrypted job identifier). In step 360, the second option contains the job identifier and other security parameters. In step 370, the application associated with the other node, sends a neighbor advertisement with an option, which contains a job identifier and other security parameters, which are encrypted. In step 380, the application on the first node receives the response, and then the job with the specified job identifier in the response is processed.

Figure 4:
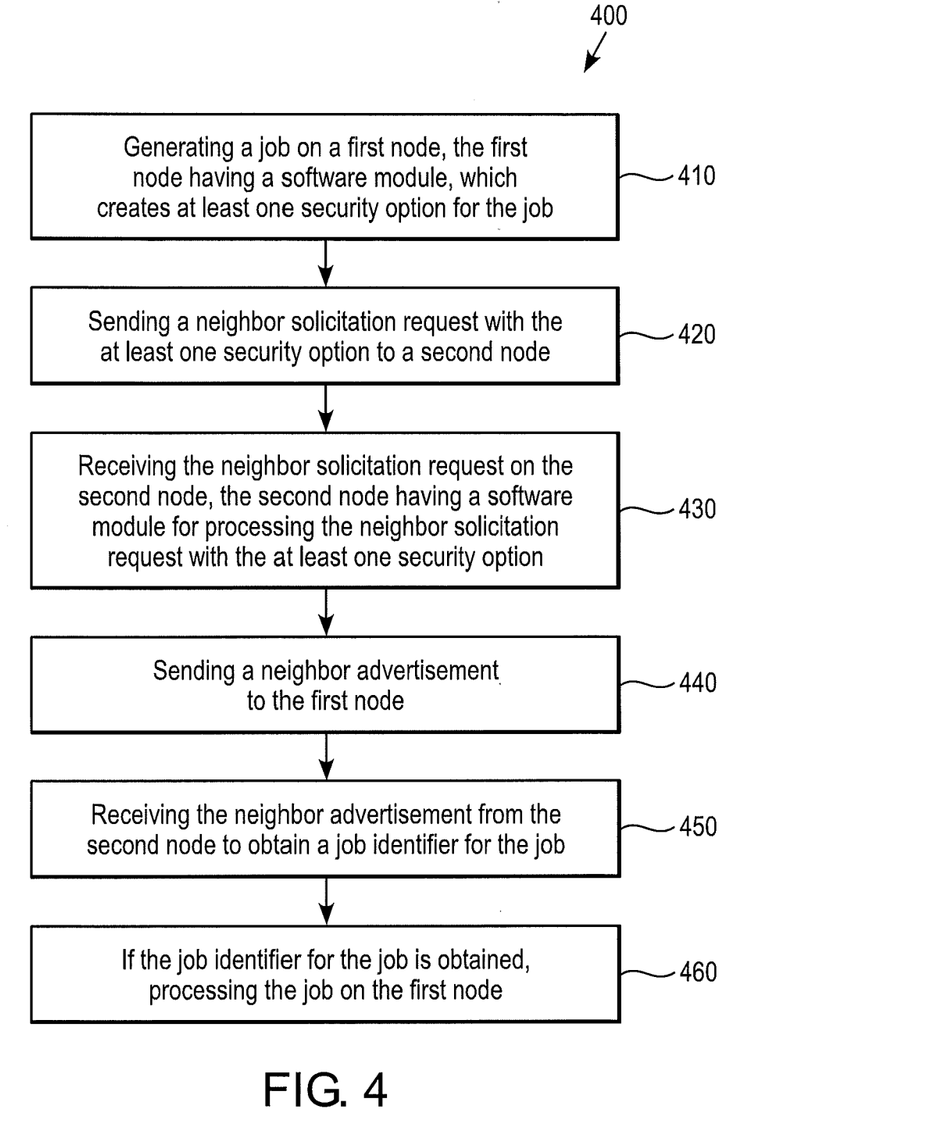
FIG. 4 is a flow chart showing an exemplary embodiment of an implementation of an application, which uses IPv6 Neighbor Discovery Options for exchange multifunction job security.

FIG. 4 is a flow chart showing another exemplary embodiment of an implementation of an application, which uses IPv6 Neighbor Discovery Options for exchange multifunction job security 400. As shown in FIG. 4, in step 410, a job is generated on a first node, the first node having a software module, which creates at least one security option for the job. In step 420, the first node sends a neighbor solicitation request with the at least one security option to a second node. In step 430, the second node receives the neighbor solicitation request, the second node having a software module for processing the neighbor solicitation request with the at least one security option. In step 440, the second node sends a neighbor advertisement to the first node. In step 450, the first node receives the neighbor advertisement from the second node to obtain a job identifier for the job. In step 460, if the job identifier for the job is obtained, the job is processed on the first node.

Figure 5:
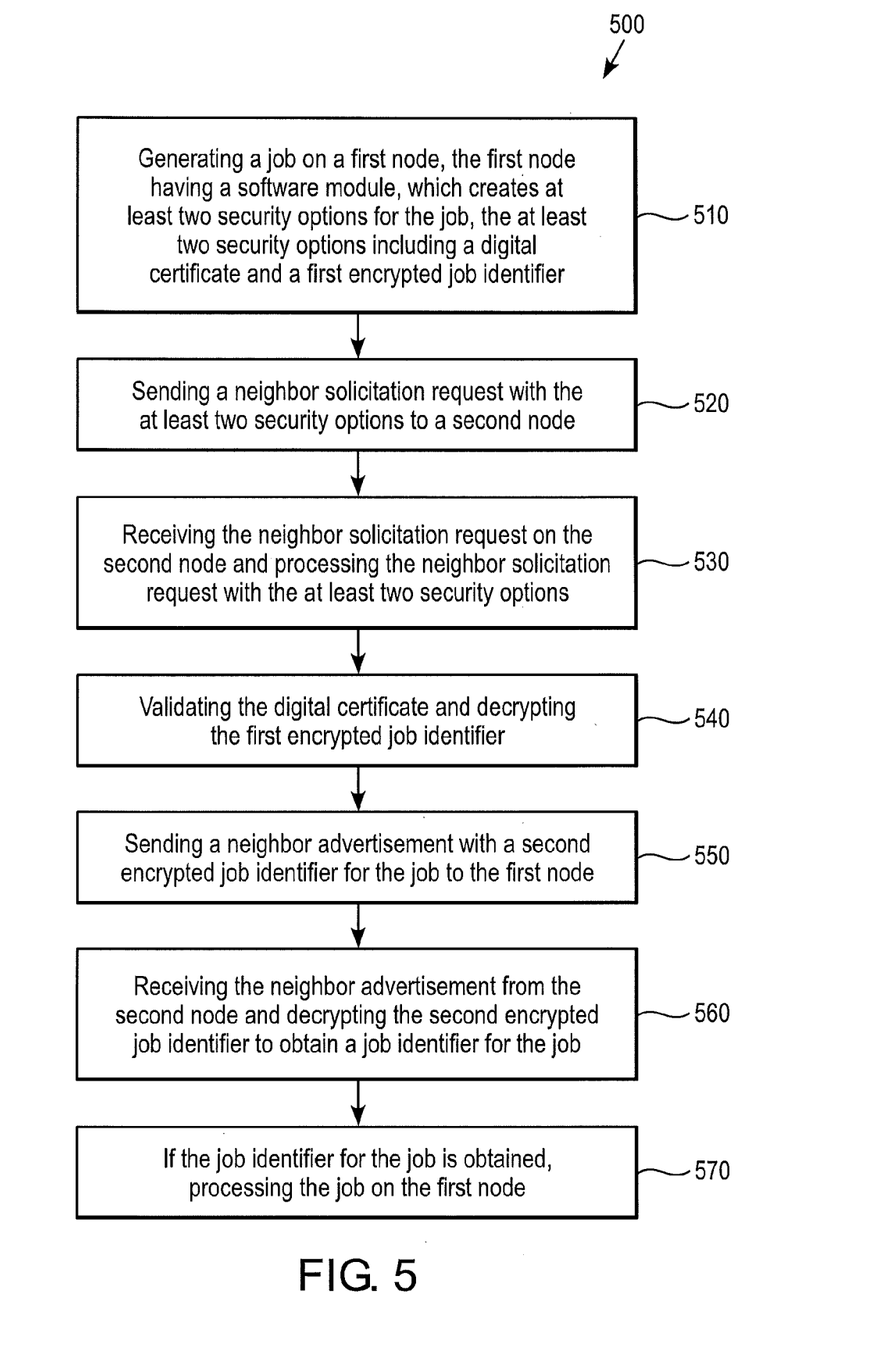
FIG. 5 is a flow chart showing a further exemplary embodiment of an implementation of an application, which uses IPv6 Neighbor Discovery Options for exchange multifunction job security.

FIG. 5 is a flow chart showing a further exemplary embodiment of an implementation of an application, which uses IPv6 Neighbor Discovery Options for exchange multifunction job security 500. As shown in FIG. 5, in step 510, a job is generated on a first node, the first node having a software module, which creates at least two security options for the job. In accordance with an exemplary embodiment, the at least two security options include a digital certificate and a first encrypted job identifier. In step 520, the neighbor solicitation request with the at least two security options is send to a second node. In step 530, the neighbor solicitation request is received on the second node. In step 540, the second node has a software module, which processes the neighbor solicitation request with the at least two security options by validating the digital certificate and decrypting the first encrypted job identifier. In step 550, a neighbor advertisement with a second encrypted job identifier for the job is sent to the first node. In step 560, the neighbor advertisement from the second node is received and the first node decrypts the second encrypted job identifier to obtain a job identifier for the job. In step 570, if the job identifier for the job is obtained, the job is processed on the first node.

A computer program product comprising a non-transitory computer usable medium having a computer readable code embodied therein for a first node and a second, the computer readable code configured to cause the first and second nodes to executed a process for a software module that facilitates exchange multifunction job security using IPv6 Neighbor Discovery, the process comprising: generating a job on a first node, the first node having a software module, which creates at least one security option for the job; sending a neighbor solicitation request with the at least one security option to a second node; receiving the neighbor solicitation request on the second node, the second node having a software module for processing the neighbor solicitation request with the at least one security option; sending a neighbor advertisement to the first node; receiving the neighbor advertisement from the second node to obtain a job identifier for the job; and if the job identifier for the job is obtained, processing the job on the first node.

The non-transitory computer usable medium, of course, may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method that facilitates exchange of multifunction job security using IPv6 Neighbor Discovery, the method comprising:

sending an unsecured job request from a client device to a multifunction peripheral via an IPv6 communication network;

receiving the unsecured job request on the multifunction peripheral, the multifunction peripheral having a first software module and a first IP filter configured to capture neighbor solicitation messages, and wherein the first software module is configured to create a job identifier and at least one neighbor discovery security option for the unsecured job request, the at least one neighbor discovery security option including a digital certificate and a first encrypted job identifier produced by encrypting the job identifier;

broadcasting a neighbor solicitation request with the at least one neighbor discovery security option to the client device;

capturing the neighbor solicitation request via a second IP filter on the client device, wherein the second IP filter is configured to capture neighbor solicitation messages and directs the neighbor solicitation request to a second software module on the client device, and wherein the second software module is configured to process the neighbor solicitation request with the at least one neighbor discovery security option;

validating the digital certificate and decrypting the first encrypted job identifier associated with the neighbor solicitation request using the second software module on the client device;

generating a second encrypted job identifier using the second software module, the second encrypted job identifier produced by encrypting the job identifier;

sending a neighbor advertisement to the multifunction peripheral, the neighbor advertisement including the second encrypted job identifier;

capturing the neighbor advertisement from the client device with the first IP filter and directing the neighbor advertisement to the first software module configured to decrypt the second encrypted job identifier to obtain the job identifier; and if the job identifier is obtained from the client device, processing the job request on the multifunction peripheral.

2. The method of claim 1, wherein the first and second encrypted job identifiers are auto-generated random numbers.

3. The method of claim 1, comprising:
dropping any neighbor solicitation request in which the client device is unable to decrypt the digital certificate and the encrypted first job identifier.

4. The method of claim 1, wherein if the second software module is able to decrypt the digital certificate and the first encrypted job identifier, stripping the neighbor solicitation request of the at least one neighbor discovery security option and creating a new checksum and accepting the neighbor solicitation request from the multifunction peripheral.

5. The method of claim 1, wherein the neighbor solicitation request is a Neighbor Discovery request and the neighbor advertisement is a Neighbor Advertisement pursuant to an IPv6 protocol.

6. The method of claim 1, wherein the step of processing the job request on the multifunction peripheral includes:
sending a job to the client device.

7. A system that facilitates exchange of multifunction job security using IPv6 Neighbor Discovery, the system comprising:
a multifunction peripheral and a client device, wherein the multifunction peripheral and the client device are configured to:
send an unsecured job request from the client device to the multifunction peripheral via an IPv6 communication network;
receive the unsecured job request from the client device on the multifunction peripheral, the multifunction peripheral having a first software module and a first IP filter configured to capture neighbor solicitation messages, and wherein the first software module is configured to create a job identifier and at least one neighbor discovery security option for the job request, the at least one neighbor discovery security option including a digital certificate and a first encrypted job identifier produced by encrypting the job identifier;

broadcast a neighbor solicitation request with the at least one neighbor discovery security option to the client device;

capture the neighbor solicitation request via a second IP filter on the client device, wherein the second IP filter is configured to capture neighbor solicitation messages and directs the neighbor solicitation request to a second software module on the client device, and wherein the second software module is configured to process the neighbor solicitation request with the at least one neighbor discovery security option;

validate the digital certificate and decrypting the first encrypted job identifier associated with the neighbor solicitation request using the second software module on the client device;

generate a second encrypted job identifier using the second software module, the second encrypted job identifier produced by encrypting the job identifier;

send a neighbor advertisement to the multifunction peripheral, the neighbor advertisement including the second encrypted job identifier for the job;

capture the neighbor advertisement from the client device with the first IP filter and directing the neighbor advertisement to the first software module configured to decrypt the second encrypted job identifier to obtain the job identifier; and if the job identifier for the job request is obtained from the client device, process the job request on the multifunction peripheral.

8. The system of claim 7, wherein the first and second encrypted job identifiers are auto-generated random numbers.

9. The system of claim 7, wherein the second software module associated with the client device drops any neighbor solicitation request in which the client device is unable to decrypt the digital certificate and the first encrypted job identifier.

10. The system of claim 7, wherein if the software module is able to decrypt the digital certificate and the first encrypted job identifier, stripping the neighbor solicitation request of the at least one security option and creating a new checksum and accepting the neighbor solicitation request from the multifunction peripheral.

11. The system of claim 7, wherein the neighbor solicitation request is a Neighbor Discovery request and the neighbor advertisement is a Neighbor Advertisement pursuant to an IPv6 protocol.

12. The system of claim 7, wherein the step of processing the job request on the multifunction peripheral includes:
sending a job to the client device.

13. A computer program product comprising a non-transitory computer usable medium having a computer readable code embodied therein for a multifunction peripheral and a client device, the computer readable code configured to cause the multifunction peripheral and the client device to execute a process for a software module that facilitates exchange of multifunction job security using IPv6 Neighbor Discovery, the process comprising:

sending an unsecured job request from the client device to the multifunction peripheral via an IPv6 communication network;

receiving the unsecured job request on the multifunction peripheral, the multifunction peripheral having a first software module and a first IP filter configured to capture neighbor solicitation messages, and wherein the first software module is configured to create a job identifier and at least one neighbor discovery security option for the job request, the at least one neighbor discovery security option including a digital certificate and a first encrypted job identifier produced by encrypting the job identifier;

broadcasting a neighbor solicitation request with the at least one neighbor discovery security option to the client device;

capturing the neighbor solicitation request via a second IP filter on the client device, wherein the second IP filter is configured to capture neighbor solicitation messages and directs the neighbor solicitation request to a second software module on the client device, and wherein the second software module is configured to process the neighbor solicitation request with the at least one neighbor discovery security option;

validating the digital certificate and decrypting the first encrypted job identifier associated with the neighbor solicitation request using the second software module on the client device;

generating a second encrypted job identifier using the second software module, the second encrypted job identifier produced by encrypting the job identifier;

sending a neighbor advertisement to the multifunction peripheral, the neighbor advertisement including the second encrypted job identifier;

capturing the neighbor advertisement from the client device with the first IP filter and directing the neighbor advertisement to the first software module configured to decrypt the second encrypted job identifier to obtain the job identifier; and if the job identifier is obtained from the client device, processing the job request on the multifunction peripheral.

14. The computer program product of claim 13, wherein the first and second encrypted job identifiers are auto-generated random numbers.

15. The computer program product of claim 13, wherein the software module associated with the client device drops any neighbor solicitation request in which the client device is unable to decrypt the digital certificate and the encrypted first job identifier.

16. The computer program product of claim 15, wherein if the software module is able to decrypt the digital certificate and the first encrypted job identifier, stripping the neighbor solicitation request of the at least one security option and creating a new checksum and accepting the neighbor solicitation request from the multifunction peripheral.

17. The computer program product of claim 13, wherein the neighbor solicitation request is a Neighbor Discovery request and the neighbor advertisement is a Neighbor Advertisement pursuant to an IPv6 protocol.

18. The computer program product of claim 13, wherein the step of processing the job request on the multifunction peripheral includes:

sending a job to the client device.

* * * * *